United States Patent
Sarkar et al.

(10) Patent No.: US 6,386,526 B1
(45) Date of Patent: May 14, 2002

(54) CABLE STAY AERODYNAMIC DAMPER BAND AND METHOD OF USE

(75) Inventors: Partha P. Sarkar, Ames, IA (US); R. Scott Phelan, Lubbock, TX (US); Kishor C. Mehta, Lubbock, TX (US); Thomas B. Gardner, Lubbock, TX (US); Zhongshan Zhao, Lubbock, TX (US)

(73) Assignee: Texas Tech University, Lubbock, TX (US)

( * ) Notice: Subject to any disclaimer, the term of this patent is extended or adjusted under 35 U.S.C. 154(b) by 0 days.

(21) Appl. No.: 09/643,754

(22) Filed: Aug. 23, 2000

Related U.S. Application Data

(60) Provisional application No. 60/149,917, filed on Aug. 23, 1999.

(51) Int. Cl.$^7$ .................................................. H02G 7/14
(52) U.S. Cl. ................... 267/136; 267/140.3; 267/153; 174/42; 174/40 R
(58) Field of Search ................. 174/42, 40 R; 267/136, 152, 153, 249, 159

(56) References Cited

U.S. PATENT DOCUMENTS

| | | | |
|---|---|---|---|
| 378,697 A | | 2/1888 | Lindenthal |
| 2,889,011 A | * | 9/1959 | Weaver ........................ 188/1 |
| 2,969,416 A | * | 1/1961 | McGavern .................... 174/42 |
| 3,246,073 A | * | 4/1966 | Bouche et al. ................ 174/42 |
| 3,378,631 A | * | 4/1968 | Edwards ...................... 174/130 |
| 3,388,208 A | * | 6/1968 | Liberman et al. ............. 174/42 |
| 3,553,345 A | * | 1/1971 | Edwards ....................... 174/42 |
| 3,581,449 A | | 6/1971 | Huber |
| 3,826,339 A | * | 7/1974 | Brokaw ........................ 174/42 |
| 3,991,550 A | | 11/1976 | Cohen |
| 3,992,566 A | | 11/1976 | Kerimov et al. |
| 4,090,168 A | | 5/1978 | Miller et al. |
| 4,246,937 A | | 1/1981 | Muller |
| 4,482,136 A | * | 11/1984 | Wolf et al. .................. 267/152 |
| 4,549,035 A | | 10/1985 | Zaltsberg |
| 4,569,708 A | | 2/1986 | Tanaka et al. |
| 4,612,680 A | | 9/1986 | Daiguji |
| 5,173,982 A | | 12/1992 | Lovett et al. |
| 5,801,329 A | * | 9/1998 | Schmidt ....................... 174/42 |
| 6,096,971 A | * | 8/2000 | Hull ............................. 174/42 |
| 6,131,873 A | * | 10/2000 | Blazon et al. ............... 248/548 |
| 6,138,309 A | * | 10/2000 | Tadros et al. ................. 14/25 |

\* cited by examiner

*Primary Examiner*—Christopher P. Schwartz
*Assistant Examiner*—Melody M. Burch
(74) *Attorney, Agent, or Firm*—Jones, Tullar & Cooper, PC

(57) ABSTRACT

Wind/rain induced vibrations, as well as vortex shedding vibrations induced in a cable stay or a similar elongated, cylindrical element are dampened and substantially eliminated by applying a plurality of flexible damper bands to the cable at spaced intervals. The damper bands break up the formation of rivulets of water at lower wind speeds. These damper bands can be retrofit to existing cables or can be installed on new cables.

13 Claims, 5 Drawing Sheets

CABLE STAY AERODYNAMIC DAMPER BAND AND METHOD OF USE

CROSS-REFERENCE TO RELATED APPLICATION

The subject patent application claims the benefit of U.S. Provisional Application Ser. No. 60/149,917, which was filed on Aug. 23, 1999. The disclosure of that provisional patent application is hereby incorporated herein by reference.

FIELD OF INVENTION

The present invention is directed generally to a cable stay aerodynamic damper band and to its method of use. More specifically, the present invention is directed to a cable stay aerodynamic damper band that is usable with both new cables and as a retro-fit to existing cables. Most particularly, the present invention is directed to damper bands that are securable to cable stays in an application pattern that significantly reduces wind/rain or other induced vibrations in the cable. The cable stay aerodynamic damper bands are structured to be attached to or placed about both new cables as well as existing cables in a particular pattern or array. The use of these damper bands has been very effective in the substantial reduction and near elimination of wind/rain induced vibrations in cable stays and of vibrations induced by the passage of a fluid, such as air or water, over the surface of a cable. The damper bands have an aerodynamic shape that counteracts these vibrations or oscillation induced in the cable stay.

DESCRIPTION OF THE PRIOR ART

The use of cable stays in the construction of a wide variety of structures is well known. Any number of types of bridges use various cables to support bridge decks, to hold bridge towers steady and to generally form the support for the bridges. Suspension bridges are one example of a bridge structure that uses a large number of elongated cables as stays and supports. In a somewhat similar manner, cables are frequently used as guy wires or as stays in connection with tall antenna towers and the like. A large number of these towers are used to support various receivers, repeaters and other similar assembles. One need not look far without seeing such a tower. A plurality of elongated cables are typically run from various elevations on these towers to suitable ground anchors. These cable stays or guy wires are used to stabilize the tower.

Elongated cables are also utilized in the underwater stabilization of floating oil drilling installations. These cables are subjected to hydrodynamic forces that are very similar to the aerodynamic forces which above ground stay cables and guy lines experience.

In all of these cable applications, the passage of a fluid, such as air or water or of wind-driven rain, over the surface of the cable induces vibration or oscillation in the cable. If the fluid velocity is sufficient, the cable can be seen to vibrate at node points with sufficient amplitude that the structure with which the cable is associated may be damaged. In the case of bridge cable stays, the bridge stays may be caused to vibrate or in extreme situations to shake sufficiently that the structural integrity of the bridge may be compromised. Such vibrations can also cause fatigue in the cables. In the situation involving sub-sea cables, the position of the anchored platform can be affected with a resultant possible mis-alignment of platform supported drill strings and other similar downhole implements.

It has been proposed in the past to provide various mechanical vibration dampers for elongated cables. In one configuration, these vibration dampeners have taken the form of shock-absorber like devices that may be interposed between an end of the cable and an anchoring or attachment site for the cable. Other similar spring-biased connections have been used in the past in an effort to compensate for or to counteract wind/rain or high speed wind induced vibrations and oscillations.

Fairings and streamlining devices have, in the past, been applied to overhead cables, to sub-sea cables and to guy wires and cable stays. These attempt to altar the shape of the generally cylindrical cable to create an airfoil or flow-smoothing shape.

It is also known in the art to fabricate structures with integrally formed annular rings and with various projections and protrusions. In these structures, the rings are formed during the fabrication of the structure, which may be a mast of an outdoor antenna, a smokestack, transmission lines or pipelines. These rings are intended to reduce or to eliminate the vortex shedding which affects structures of these types. The elimination of this vortex shedding will greatly reduce the oscillating lateral forces which smokestacks, antennas, transmission lines and other cylindrical structure have been plagued by due to this periodic shedding of vortices.

While the prior art has appreciated the use of various vibration dampers and integrally formed annular rings and bands as well as various fairings and spoilers, there continues to exist a need for cable stay aerodynamic dampers and their method of use and application which will overcome the limitations of the prior art devices.

SUMMARY OF THE INVENTION

It is an object of the present invention to provide a cable stay aerodynamic damper band.

Another object of the present invention is to provide a method of using cable stay aerodynamic damper bands.

A further object of the present invention is to provide a cable stay aerodynamic damper band for retrofit use.

Still another object of the present invention is to provide a cable stay aerodynamic damper band which is effective in counteracting wind and rain induced vibration.

Yet a further object of the present invention is to provide a cable stay aerodynamic damper band which damps both low and high modal vibrations.

Even still another object of the present invention is to provide a cable stay aerodynamic damper band which is economical to use and which is easily attached.

As will be set forth in greater detail in the description of the preferred embodiments which are presented subsequently, the cable stay aerodynamic damper band in accordance with the present invention, and its method of use is primarily intended to counteract wind and rain induced vibrations in cable stays of structures, such as bridges and the like. It has been determined that the presence of small livers or rivulets of water running along the length of a cable stay, in combination with wind velocities in the range of 15–35 MPH can create very dramatic vibrations in the cable stay. These vibrations are not always the high modal vibrations such as would occur with high wind velocity directed perpendicularly to a taut cable or cylindrical structure and which typically create classic vortex shedding. Instead, these vibrations, which typically occur when the wind is coming from behind the cable, will typically cause first, second and third modes of vibrations. These wind/rain induced vibrations are clearly visible to the naked eye and thus are very unsettling to a motorist traveling across the bridge supported by these vibrating cable stays. More importantly, these low modal, violent vibrations can and do cause significant cable fatigue and other structural problems.

The existence of wind/rain induced vibrations in cable stays is a phenomenon that can be counteracted by properly designing the stay cables of a structure before it is erected. Unfortunately, there has not, in the prior art, been a practical retro-fit solution for bridges and cable stays which are already in place. The use of mechanical dampers at both ends of the cable is one current solution. Such mechanical dampers act as shock absorbers. They do nothing to prevent the wind/rain induced vibrations of the cable. They merely attempt to prevent it from being transmitted to the bridge structure. These mechanical dampers are large, expensive, heavy devices which are difficult to install and which have only a marginal amount of success.

Another current solution is to utilize a restrainer system in which adjacent cable stays are connected to each other by fixed length bars or stabilizers. This solution is again difficult and costly to implement, and may give rise to induced vibrations in adjacent cables. Further, the use of these restraint systems generally destroys the aesthetics of the bridge design.

The cable stay aerodynamic dampers bands, and their method of usage, in accordance with the present invention, provide an effective, cost efficient solution to the problem of cable stay vibration and particularly to wind/rain induced cable stay vibration. The cable stay damper bands utilize flexible or rigid cable encircling bands which carry embedded or attached tension straps. The cable encircling bands can be placed about existing cables in the field without taking the structure, such as a bridge out of service and without the need for large amounts of specialized equipment.

The cable stay aerodynamic damper bands of the present invention break up the rivulets or small rivers of water which tend to form on, and to travel along the cable stays. It is believed that these rivulets tend to act as an airfoil on the cable stays and that their existence is quite important to the generation of the low modal cable stay vibrations which the damper bands of the present invention have been so effective in reducing or eliminating. The damper bands of the present invention will also be effective in reducing or eliminating vortex shedding induced vibrations, such as the so called KARMAR VORTEX STREET vibrations. However, such higher mode vibrations typically 7th or 8th mode vibrations, are not as severe with respect to fatigue loadings as the lower mode wind/rain induced vibrations whose elimination is the primary problem to which the present cable stay aerodynamic damper bands are directed.

The damper bands of the present invention have been found to be very effective when applied to an existing cable stay in a pattern of bands placed along the cable at a spacing of preferably twice to four times the diameter of the cable. While this will result in the use of a large number of bands, the number of these bands is nowhere near the number suggested in the prior art as being required. The flexible or rigid bands can be installed effectively using uncomplicated techniques so that minimal disruption to the structure during damper band installation will occur.

Unlike prior proposed solutions, the cable stay aerodynamic damper bands of the present invention are not particularly conspicuous, do not require adjacent cables to be connected together, are durable and require essentially no maintenance, and are not apt to add a great amount of weight to the cable stays to which they are attached. The cable stay aerodynamic damper bands and their methods of use, in accordance with the present invention, overcome the limitations of the prior art solutions. They represent a substantial advance in the art.

BRIEF DESCRIPTION OF THE DRAWINGS

While the novel features of the cable stay aerodynamic damper bands and their method of use, in accordance with the present invention will be set forth with particularity in the appended claims, a full and complete understanding of the invention may be had by referring to the detailed description of the preferred embodiments, as will be set forth subsequently, and by referring to the accompanying drawings, in which:

DESCRIPTION OF THE PREFERRED EMBODIMENTS

Figure 1:
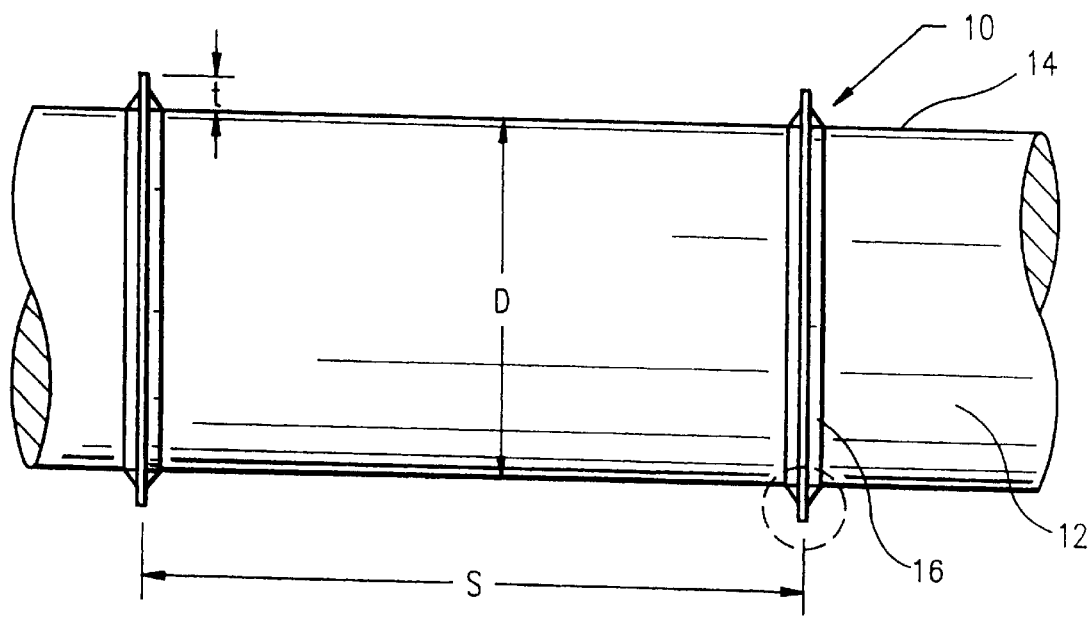
FIG. 1 is a side elevation review of a portion of a cable stay carrying several of the damper bands in accordance with the present invention.

Referring initially to FIG. 1 there may be seen generally at 10 a first preferred embodiment of a cable stay aerodynamic damper band in accordance with the present invention. Damper band 10 is shown in place encircling a cable stay, generally at 12. It will be understood that cable stay 12 is very schematically depicted and is intended to be representative of a large variety of cable stays. It will be readily apparent that such cable stays 12 are typically not one solid piece of metal but instead are a compound arrangement of numerous strands of material and other materials wound together and are sometimes filled with a grout or mortar-type material. Since cable stay 12 forms no part of the subject invention, it will not be discussed in detail. Suffice it to say that cable stay 12 has a cable diameter D and has a surface 14 which typically is not completely smooth but instead is a repeating pattern of helically extending peaks and valleys formed as the cable strands are wound together to form the resultant cable stay 12 or as durable pieces of tape are wound around the cables or the outer coverings, such as pipes, in which the cables may be contained.

Each cable stay aerodynamic damper band 10 is embodied to be placed about an existing cable; i.e. is primarily intended for retro-fit applications. The cable stay band 10 has a flexible body 16 which, as seen most clearly in FIG. 2, may be generally triangular in cross-section. A projection 18 may extend away from the apex 20 of the sides 22 and 24 of the generally triangular band 16. The base 26 of the generally triangular shaped damper band 16 may include a resilient portion 28. This resilient portion 28 will compensate for dimensional variations in the surface 14 of the cable 12 to which the bands are secured, and will also provide a watertight seal. A suitable elastic membrane may be placed on the base 26 of the band 16 to provide the band resilient portion 28.

Figure 2:
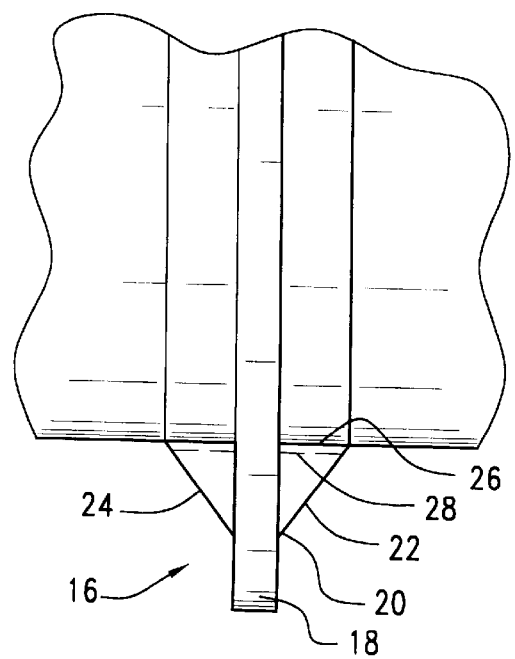
FIG. 2 is an enlarged view of the portion of the cable stay and damper band encircled in FIG. 1.

The damper band 10 shown in FIGS. 1 and 2 is depicted having a generally triangular-shaped band body 16. It will be understood that this is representative of a number of band body cross-sectional shapes which could be used. The projection 18 on the band body 16 is instrumental in stopping the flow of rivulets of water and re-directing the wind flow along the length of the cable stay 12 to which the damper bands 16 are secured. It is also possible that the damper bands themselves, without the addition of the projections 18 will be effective in stopping the rivulet flow and in re-directing the wind flow along the cable 12.

The body 16 of each damper band 10 is made of a suitable resilient, flexible material so that it will be able to be wrapped about the outer surface 14 of the cable stay 12 to which it is to be secured. The band has sufficient built-in tolerance or stretch so that it will form a tight compressive seal against the cable stay 12 whose diameter D is apt to vary slightly along its length. Any number of plastic or polymeric materials, which will exhibit the required built-in dimensional tolerances and which will tolerate long term exposure are suitable for use. The band may carry an elastic membrane as the resilient portion 28 that provides the watertight seal. In addition, elastic membranes may be placed at the ends 30 of the band body, as seen in FIG. 3.

Figure 3:
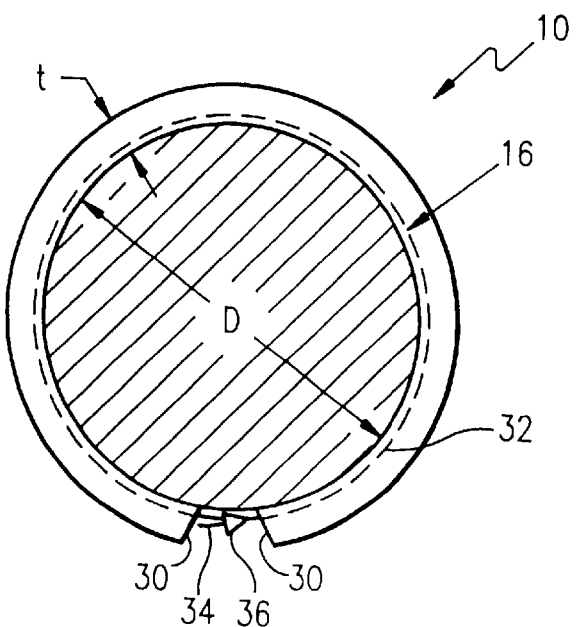
FIG. 3 is an end view of the cable of FIG. 1 showing a first embodiment of a damper band in accordance with the present invention.
Figure 4:
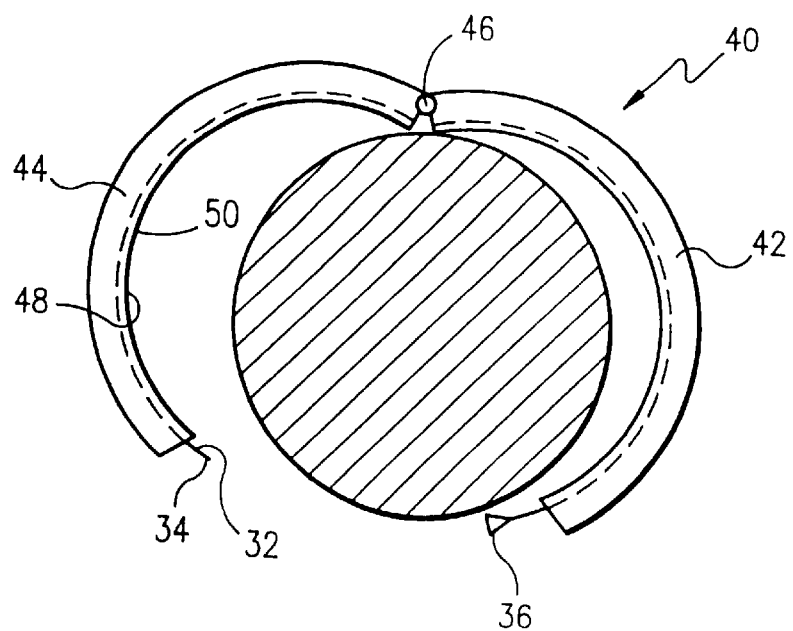
FIG. 4 is a view similar to FIG. 3 and showing a second preferred embodiment of a damper band of the present invention.

As is also shown in FIG. 3, which is not to scale, the damper band 10 is provided with an internally situated tension strap, generally at 32. This tension strap 32 is used to secure the band body 16 to the cable surface 14. This tension strap 32 can be plastic, metallic or of another suitable material and will produce a uniform, long term compressive hoop stress around the damper band body 16. This tension strap 32 is provided with a male end 34 and a female end 36, as seen in FIGS. 3 and 4. The tensioning strap 32 could be provided as a plastic wire tie, a metallic hose clamp or a similar elongated strap which will be embedded in, or pass along the body 16 of the damper band 10.

As indicated above, the drawings depicting the subject invention are not to scale. The size of the damper bands has been increased for purposes of illustration. It has been determined that the size of the damper band 10, with respect to the size of the cable stay 12 should be within certain ranges to produce the best results. The spacing S between adjacent damper bands 10, as seen in FIG. 1 is determined by the relationship of S or band spacing being between two and four times the cable stay diameter D. Thus, if the cable stay has a diameter of 4½ inches, the band spacing S should be between 9 and 18 inches. Each band body 16 has a thickness t, as also shown in FIG. 1. This thickness t should be selected to be in the range of between D/10 and D/20. Again if the cable stay diameter is 4½ inches, the band thickness t should be between 0.45 inches and 0.225 inches.

Turning now to FIG. 4, there may be such a second preferred embodiment of a cable stay aerodynamic damper band, generally at 40, in accordance with the present invention. In contrast to the damper band 10 which is made of a resilient, flexible material that will readily deform about the cable stay 12, the damper band 40, as shown in FIG. 4, may be made of a less flexible material. Two half circle band body segments 42 and 44 are secured to each other by a suitable hinge 46. These band body segments 42 and 44 must still exhibit sufficient resiliency to accommodate variations in the cable stay diameter D along the length of the cable stay 12. A watertight seal material 48 may again be placed along a base portion 50 of each of the band body segments 42 and 44. This watertight seal material may not be required in all situations. Its useage will depend on both the cable stay and the ring material. The tensioning strap 32 is also provided, in the same manner as was discussed previously in connection with damper band 10. The radially outwardly extending projection 18 described in connection with the first preferred embodiment 10, is not shown in the second embodiment 40. However, it is to be understood that this is for reasons of clarity. The projection 18 of band 10 could also be used with band 40. The hinge 46 of cable stay aerodynamic damper band 40 could be as simple as a so-called living hinge or could be a more traditional hinge, depending on the size of the band body of the damper band 40. As was the case with the first preferred embodiment 10, the cross-sectional shape of the body of the damper band 40 can also be varied to suit the specific application. In both of these preferred embodiments, as well as in the several to be discussed shortly, the band body 16 or the band body segments 42 and 44 do not have to extend 360° around the surface 14 of the cable stay 12.

Figure 5:
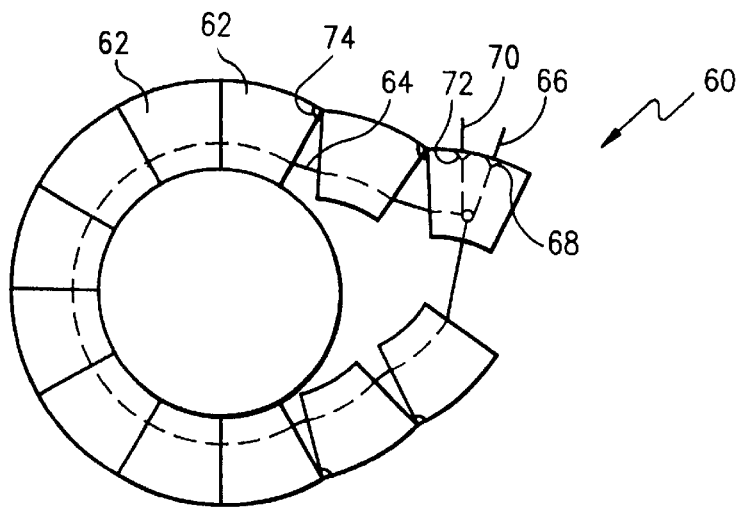
FIG. 5 is a side elevation view of a third preferred embodiment of a cable stay aerodynamic damper band having a multi-segmented body.
Figure 9:
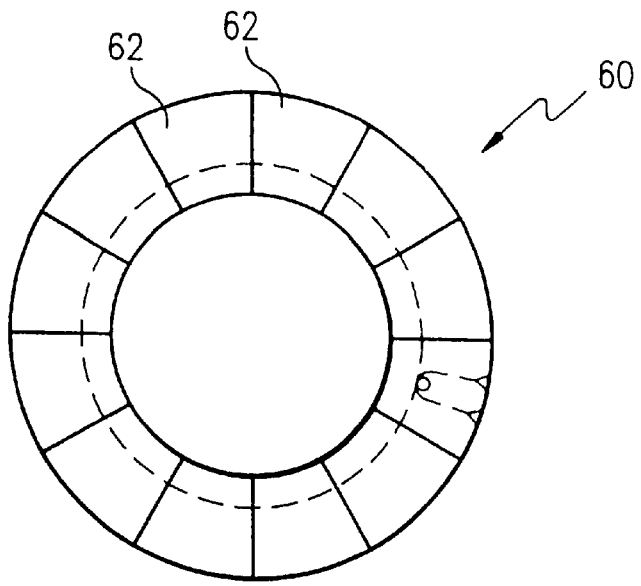
FIG. 9 is another view of the cable stay aerodynamic damper band of FIG. 5 now secured in place on a cable.

A third preferred embodiment of a cable stay aerodynamic damper band, in accordance with the present invention, is shown generally at 60 in FIGS. 5 and 9. In this third preferred embodiment, the damper band 60 is comprised of a plurality of band body segments 62. If, for example, a projection member, which is not specifically shown, is to be used with the damper band, and is to be made of metal, the band body segmented construction of FIGS. 5 and 9 will be advantageous. In this third embodiment, the watertight seal providing material is not specifically depicted and may not be required in all applications. As was the case with the previously described embodiment, this seal material will be usable to produce a good seal against the surface 14 of the cable stay 12. The damper band 60 also has built-in tolerance allowances for slight changes in the cable stay diameter along the length of the stay. These can be accomplished by the provision of an elastic material on the end faces of the two band body segments 62 which will abut each other after the band has been placed about the cable stay. A suitable tension strap 64 is embedded in, or carried in the several band body segments 62. This tension strap can be anchored at a first end 66 to a suitable anchor 68 and can have a second end 70 that will be receivable in a strap tightening fixture 72. This tension strap 64 and its anchor 68 and strap tightener 72 will be similar to the corresponding structures described in connection with FIGS. 3 and 4.

The several band body segments 62 are connected together by a top linkage assembly, generally at 74. The top linkage assembly 74 resists the outer pull-out force resulting from the tension strap 64 and holds the band body segments 62 in their correct orientation as the damper band 60 is placed about the cable stay 12 and the tension strap free or second end 70 is fed through the strap tightener 72. Once the tension strap 64 has been tightened, the end or ends projecting out beyond the body segments can be cut off.

Figure 6:
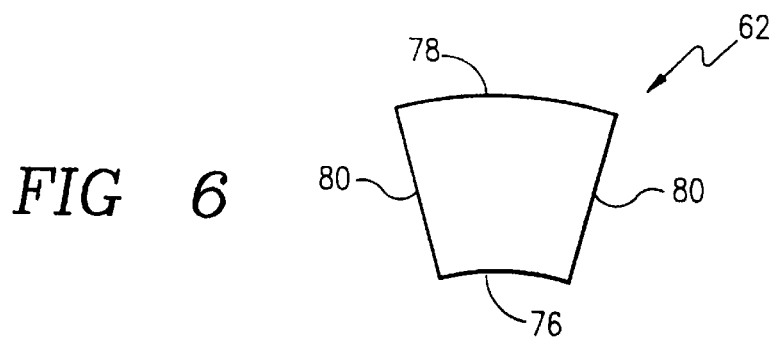
FIGS. 6–8 are side elevation views of different segment shapes useable in the damper band of FIG. 5.

In the configuration shown in FIGS. 5 and 9, each of the band body segments 62 is generally trapezoidal in side view. This shape for a single band body segment 62 is shown in FIG. 6. As may be seen there, the body segment 62 has somewhat arcuate inner and outer surfaces 76 and 78, respectively. The radial side walls 80 are generally planar. The overall shape is generally similar to a keystone.

Figure 7:
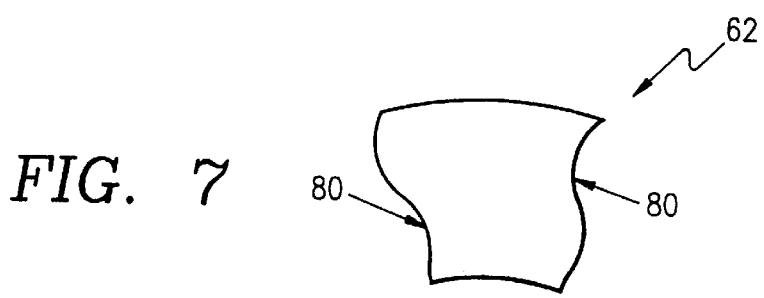
Figure 8:
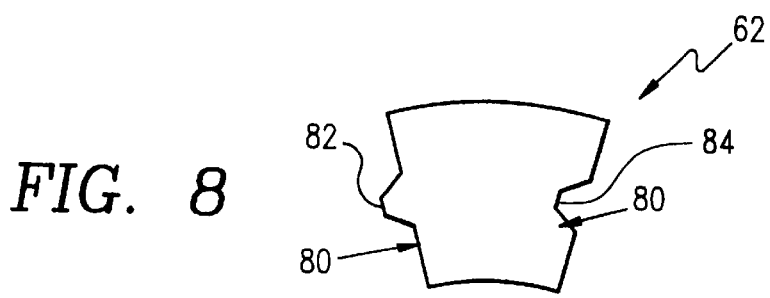

Alternative shapes for the band body segments 62 are shown in FIGS. 7 and 8. In both of these, the two radial walls 80 of each segment 62 are shaped to engage the adjacent radial wall of the next adjacent band body segment 62. In FIG. 7, there are shown somewhat sinusoidal radial walls 80. In FIG. 8 the radial walls have a cooperating shear key shape in which one radial wall 80 of each segment has a key 82 and the other radial wall 80 has a keyway 84. It will be understood that other cooperating radial wall shapes are also within the scope of the present invention.

Figure 10:
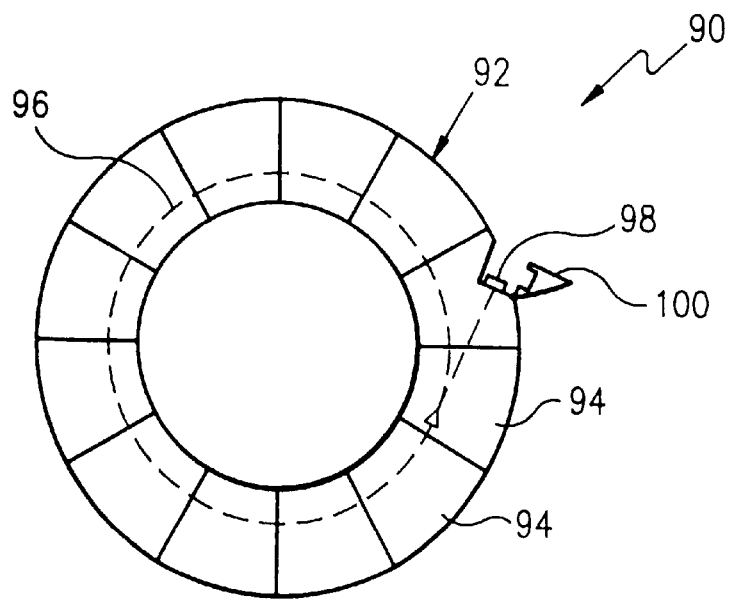
FIG. 10 is a view similar to FIG. 9 of a fourth preferred embodiment of a cable stay aerodynamic damper band of the present invention.

A fourth preferred embodiment of a cable stay aerodynamic damper band in accordance with the present invention is shown generally at 90 in FIG. 10. In this fourth preferred embodiment, the damper band 90 has a band body 92 comprised of a plurality of similarly shaped band body segments 94, which are generally the same as the band comprising segments 62 discussed in connection with the third preferred embodiment 60. In this fourth preferred embodiment 90, the tensioning strap 96 is tightened by a bolt 98 in a manner generally analogous to a hose clamp, as was discussed in connection with the first embodiment. A suitable removable cap 100 is provided so that the bolt head of the bolt 98 can be covered once the damper band 90 has been placed on the cable stay.

Figure 11:
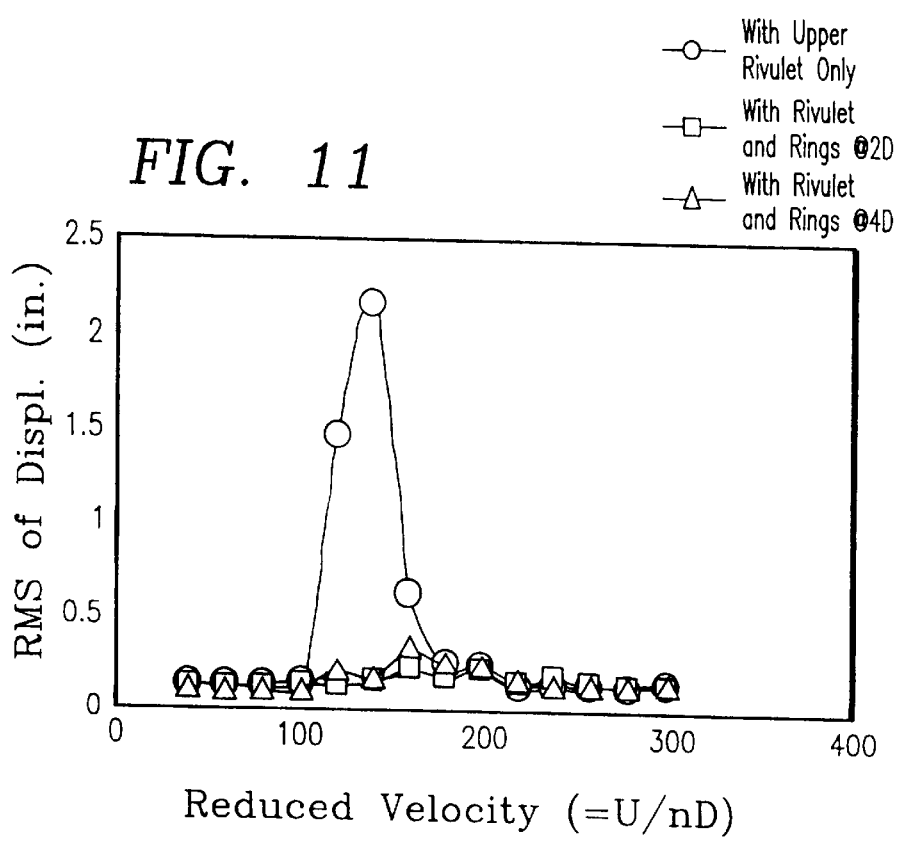
FIG. 11 is a graphical depiction of cable displacement in a wind/rain induced vibrating cable without and with the damper bands of the present invention.

The cable stay aerodynamic damper bands in accordance with the present invention have proved to be very successful in reducing both wind/rain induced vibrations or oscillations, which are generally in the range of second or third modes of vibration, and also the vortex shedding induced vibrations or oscillations, which are more typically higher, such as seventh or eighth modes of vibration. Referring now to FIG. 11 there is shown a graph of cable stay vibration, charted as the root mean square of cable displacement in inches and as a function of wind speed. The x-axis scale of velocity of 100 to 200 units is equivalent to a velocity of 15–35 MPH for a typical cable stay. As will be seen, in a cable stay that is subjected to an upper rivulet; i.e. to a small stream of water extending along its length, the vibrational displacement is severe at a relatively low speed. At increased air or wind speeds, the wind/rain induced vibration is apt to dissipate because the formation of rivulets no longer occurs. However, in the more frequently occurring 15–35 MPH range, with rain, the cable stay vibration is very substantial. The addition of the aerodynamic damper bands or rings, as described above, has a very profound effect on reducing and virtually eliminating these wind/rain induced vibrations. Placement of the damper bands at spacings of either 2 times the cable diameter or 4 times the cable diameter greatly reduces the lower wind velocity wind/rain induced vibrations.

Figure 12:
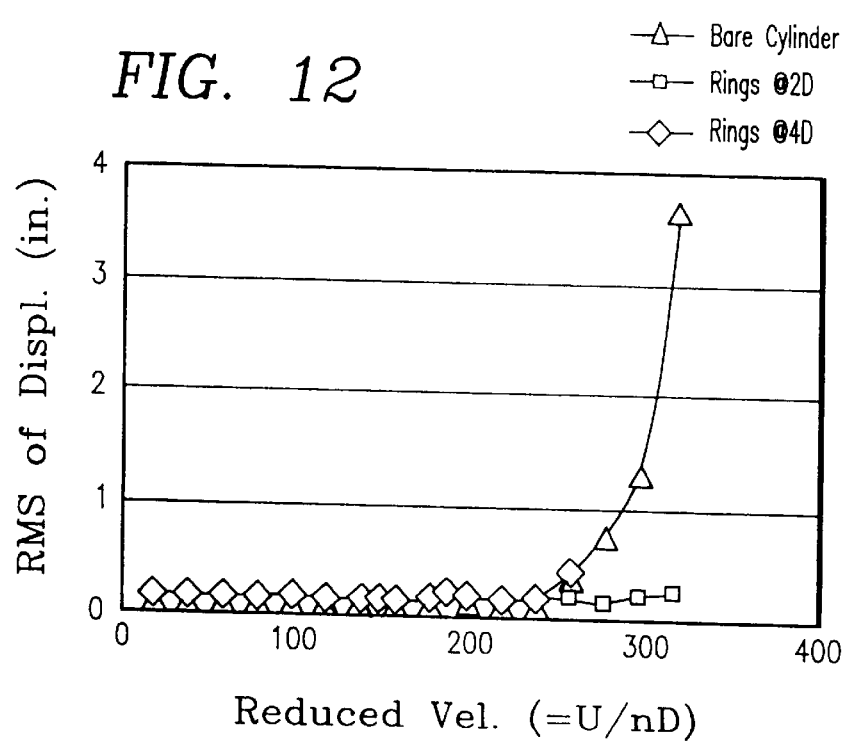
FIG. 12 is a graphical depiction of a wind induced cable stay vibration without and with the damper bands of the present invention.

FIG. 12 demonstrates the effectiveness of the cable stay aerodynamic damper bands of the present invention in reducing the vortex shedding or other wind induced vibrations or oscillations that are apt to occur at higher wind velocities. As may be seen in FIG. 12 when the wind velocity increases to generally in the area of 50 MPH, i.e. to approximately 240 units as represented on the x-axis of the graph, the cable vibration created by this wind increases dramatically. The addition of the damper bands of the present invention, again at a spacing of two to four times the cable stay diameter will essentially eliminate these vibrations. Thus it can be seen that the retrofitting of an existing cable, or the installation on a new cable of the cable stay aerodynamic damper bands in accordance with the present invention, and at the spacing and size discussed above, is very effective in the virtual elimination of both lower mode of vibration wind/rain induced vibration as well as the higher mode of wind induced cable stay vibrations.

While preferred embodiments of a cable stay aerodynamic damper band and its method of use, in accordance with the present invention have been described fully and completely hereinabove, it will be apparent to one of skill in the art that a number of changes in, for example the overall size of the cable stay, the use to which the cable stay will be put, the material used to form the cable stay, and the like could be made without departing from the true spirit and scope of the present invention which is accordingly, to be limited only by the following claims.

What is claimed is:

1. a cable stay aerodynamic damper band comprising:
   a cable stay aerodynamic damper band body having first and second ends, said cable stay aerodynamic damper band body being flexible and being sized to at least partially encircle a cable stay and having a band body cross-sectional shape adapted to dampen vibrations in a cable stay induced by passage of a fluid over a surface of a cable stay on which said cable stay aerodynamic band body is placed;
   a cable stay aerodynamic damper band body base, said base being formed on said cable stay aerodynamic damper band body and being adapted to directly engage a surface of a cable stay to which said cable stay aerodynamic damper band body is secured;
   a tensioning strap in said cable stay aerodynamic damper band body; and
   means for tightening said tensioning strap to tighten said cable stay aerodynamic damper band body about a cable stay, said first and second ends of said cable stay aerodynamic damper band body being moved toward each other during said tightening of said tensioning strap.

2. The cable stay aerodynamic damper band of claim 1 wherein said damper band body is a single element.

3. The cable stay aerodynamic damper band of claim 1 wherein said damper band body has first and second damper band body segments and further including a hinge joining said first and second damper band body segments.

4. The cable stay aerodynamic damper band of claim 1 wherein said damper band body is a plurality of connected damper band body segments and further including a top linkage between each adjacent one of said plurality of band body segments, each said top linkage connecting said adjacent ones of said plurality of band body segments.

5. The cable stay aerodynamic damper band of claim 1 wherein said first and second cable stay aerodynamic damper band body ends are engageable with each other when said tension strap is tightened to tighten said cable stay aerodynamic damper band body around a cable stay surface.

6. The cable stay aerodynamic damper band of claim 1 further including a watertight seal on said damper band body and engageable with a cable stay surface.

7. The cable stay aerodynamic damper band of claim 6 wherein said watertight seal is an elastic membrane material.

8. The cable stay aerodynamic damper band of claim 4 wherein each of said plurality of damper band body segments is generally trapezoidal and has an inner arcuate surface and an outer arcuate surface and spaced radial side walls.

9. The cable stay aerodynamic damper band of claim 8 wherein said radial side walls are planar.

10. The cable stay aerodynamic damper band of claim 8 wherein said radial side walls are cooperatively shaped.

11. The cable stay aerodynamic damper band of claim 10 wherein said radial walls have cooperating keys and keyways.

12. The cable stay aerodynamic damper band of claim 1 further including a tension strap bolt, said bolt including a head, and further including a cap for said head of said bolt.

13. A method of damping wind/rain induced vibrations in a cable stay including:

determining a cable stay diameter;

providing a plurality of cable stay aerodynamic damper bands with each of said plurality of cable stay aerodynamic damper bands having a cable stay aerodynamic damper band body having first and second ends, each said cable stay aerodynamic damper band body being flexible; sizing each of said cable stay aerodynamic damper band bodies to at least partially encircle a cable stay; providing each of said cable stay aerodynamic damper band bodies with a cross-sectional shape adapted to dampen vibrations in a cable stay induced by passage of a fluid over a surface of a cable stay on which said cable stay aerodynamic damper band is placed and with a thickness of each said damper band body being in the range of one-tenth to one-twentieth of said cable stay diameter providing each of said cable stay aerodynamic damper bands with a cable stay aerodynamic damper band body base, each said base being formed on said cable stay aerodynamic damper band body and being adapted to directly engage a surface of a cable stay to which each said cable stay aerodynamic damper band body is secured; providing a tensioning strap in each said cable stay aerodynamic damper band body; providing means for tightening said tensioning strap to tighten each said cable stay aerodynamic damper band body about a cable stay, said first and second ends of each said cable stay aerodynamic damper band body being moved toward each other during said tightening of said tensioning strap spacing said plurality of said cable stay aerodynamic damper bands along said cable stay at a spacing distance of two to four times said cable stay diameter; and securing each of said cable stay damper bands to said cable stay aerodynamic at said spacing distance using said tensioning strap in each of said plurality of cable stay aerodynamic damper band bodies.

\* \* \* \* \*

UNITED STATES PATENT AND TRADEMARK OFFICE
CERTIFICATE OF CORRECTION

PATENT NO. : 6,386,526 B1
DATED : May 14, 2002
INVENTOR(S) : Partha P. Sarkar, R. Scott Phelan, Kishor C. Mehta, Thomas B. Gardner and Zhongshan Zhao It is certified that error appears in the above-identified patent and that said Letters Patent is hereby corrected as shown below:

<u>Columns 9 and 10,</u>
Please replace claim 13, as follows:

-- 13. A method of damping wind/rain induced vibrations in a cable stay including:

determining a cable stay diameter;

providing a plurality of cable stay aerodynamic damper bands with each of said plurality of cable stay aerodynamic damper bands having a cable stay aerodynamic damper band body having first and second ends, each said cable stay aerodynamic damper band body being flexible;

sizing each of said cable stay aerodynamic damper band bodies to at to at least partially encircle a cable stay;

providing each of said cable stay aerodynamic damper band bodies with a cross-sectional shape adapted to dampen vibrations in a cable stay induced by passage of a fluid over a surface of a cable stay on which said cable stay aerodynamic damper band is place and with a thickness of each said damper band body being in the range of one-tenth to one-twentieth of said cable stay diameter;

providing each of said cable stay aerodynamic damper bands with a cable stay aerodynamic damper band body base, each said base being formed on said cable stay aerodynamic damper band body and being adapted to directly engage a surface of a cable stay to which each said cable stay aerodynamic damper band body is secured;

providing a tensioning strap in each said cable stay aerodynamic damper band body;

providing means for tightening said tensioning strap to tighten each said cable stay aerodynamic damper band body about a cable stay, said first and second ends of each said cable stay aerodynamic damper band body being moved toward each other during said tightening of said tensioning strap;

UNITED STATES PATENT AND TRADEMARK OFFICE
CERTIFICATE OF CORRECTION

PATENT NO.    : 6,386,526 B1
DATED         : May 14, 2002
INVENTOR(S)   : Partha P. Sarkar, R. Scott Phelan, Kishor C. Mehta, Thomas B. Gardner and Zhongshan Zhao It is certified that error appears in the above-identified patent and that said Letters Patent is hereby corrected as shown below:

Columns 9 and 10 cont'd.

spacing said plurality of said cable stay aerodynamic damper bands along said cable stay at a spacing distance of two to four times said cable stay diameter; and securing each of said cable stay aerodynamic damper bands to said cable stay at said spacing distance using said tensioning strap in each of said plurality of cable stay aerodynamic damper band bodies. --

Signed and Sealed this

Twenty-fourth Day of September, 2002

Attest:

Attesting Officer

JAMES E. ROGAN
*Director of the United States Patent and Trademark Office*